United States Patent [19]

Tornberg et al.

[11] Patent Number: 5,617,896

[45] Date of Patent: Apr. 8, 1997

[54] VALVE HAVING A CLOSURE MEMBER FOR CREATING FLOW TURBULENCE IN THE VALVE

[75] Inventors: Jouko Tornberg, Vantaa; Jyrki Huovila, Muurame; Pekka Kivipelto; Jouni Pyötsiä, both of Helsinki, all of Finland

[73] Assignee: Neles-Jamesbury Oy, Helsinki, Finland

[21] Appl. No.: 442,312

[22] Filed: May 16, 1995

[51] Int. Cl.⁶ ........................................ F16C 1/16
[52] U.S. Cl. ........................ 137/813; 251/208; 251/301
[58] Field of Search .................... 251/126, 208, 251/298, 301; 137/813

[56] References Cited

U.S. PATENT DOCUMENTS 3,946,986   3/1976   Sutter et al. ..................... 251/298
4,121,607  10/1978   Bader ............................ 251/298
4,679,595   7/1987   Johannessen ................. 137/813 X
4,969,481  11/1990   Horii ............................ 137/813
4,989,833   2/1991   Polón ........................... 251/208
5,052,442  10/1991   Johannessen ................. 137/813 X

FOREIGN PATENT DOCUMENTS 2436922   5/1990   France ........................... 137/813

*Primary Examiner*—Edward K. Look
*Assistant Examiner*—Michael S. Lee
*Attorney, Agent, or Firm*—Cushman Darby & Cushman IP Group of Pillsbury Madison & Sutor LLP

[57] ABSTRACT

A valve and method for adjusting the flow of a valve and for forming a turbulence in the flow. The flow is led tangentially from the inlet passage (2) into the space inside the valve body (1) in such a way that a turbulent flow is formed inside the valve body, outside the closure member. The flow volume is adjusted before the flow is brought into turbulence.

5 Claims, 6 Drawing Sheets

VALVE HAVING A CLOSURE MEMBER FOR CREATING FLOW TURBULENCE IN THE VALVE

FIELD OF THE INVENTION

This invention relates to a method for adjusting the flow of a valve and for forming a turbulence in the flow by adjusting the flow volume by means of a movable closure member and by leading the flow tangentially from the inlet passage into the space inside the valve body in such a way that a turbulent flow is formed inside the valve body, outside the closure member. The invention also relates to a valve which includes a valve body, inside the valve body a movable closure member for adjusting the flow through the valve, an inlet passage and an outlet passage, the inlet passage joining tangentially the space inside the valve body.

BACKGROUND OF THE INVENTION

In head boxes of paper making machines, pulp suspension is fed from the head box to the wire through a lip passage. The area weight profile and the fiber orientation profile transversely to the fiber web can be adjusted by leading desired amounts of diluting liquid at desired points along the width of the fiber web. FI patent publication 92229 discloses an arrangement where mixing units are arranged adjacently to each other along the width of the machine. Fiber suspension and diluting liquid, are fed through separate inlets into each mixing unit where they are mixed and discharged through a single outlet of the mixing unit.

It is well known that the suspension flow to the wire cloth has to be even to maintain the quality of the fiber web even. Clogging of any parts of the feeding elements of the machine will be harmful in this respect. In order to avoid clogging, fiber bundles in the liquid flows have to be avoided. Clogging is particularly harmful when the uneven quality of the fiber web results in tearing of the web and expensive stops in the production.

EP publication 633 416 discloses one valve type where clogging is avoided by using a tangential inlet passage which causes the flow to form a turbulence or vortex in the valve. In this prior art valve, the adjusting of the flow is done by means of an axially movable rod after bringing the flow first into a turbulence.

SUMMARY OF THE INVENTION

The object of the present invention is to improve the turbulence effect of the valve. The method of the invention is characterized in that the flow volume is adjusted before the flow is brought into turbulence. The valve of the invention is characterized in that the closure member is arranged in such a way that in the closed position of the valve, the closure member closes the opening at the connection between the inlet passage and the space inside the valve body.

In the valve of the invention, the turbulence is formed after choking, and this means that the turbulence will not easily fade out. The turbulence is maintained and so the risk of clogging can be minimized. Due to the open, streamlined shape of the space inside the valve body, the flow-through capacity of the valve is high. In addition, the valve can be tightly closed for instance when it has to be flushed for cleaning. The valves can be used for instance in the flow lines by means of which diluting liquid is fed into pulp suspension at desired points of the fiber web.

BRIEF DESCRIPTION OF THE DRAWING

The invention and its details are described in detail in the following, with reference to the enclosed drawings in which.

DETAILED DESCRIPTION OF THE INVENTION

Figure 1:
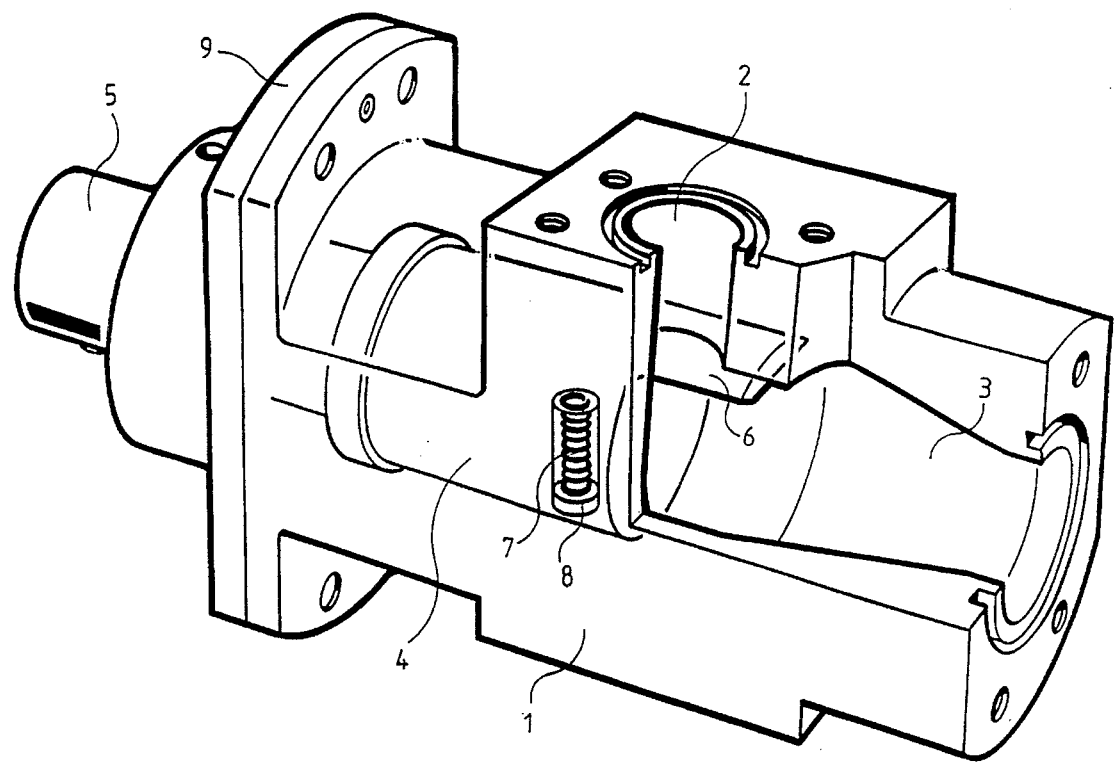
FIG. 1 is a perspective view of one embodiment of a valve according to the invention, part of the body being cut off.
Figure 2:
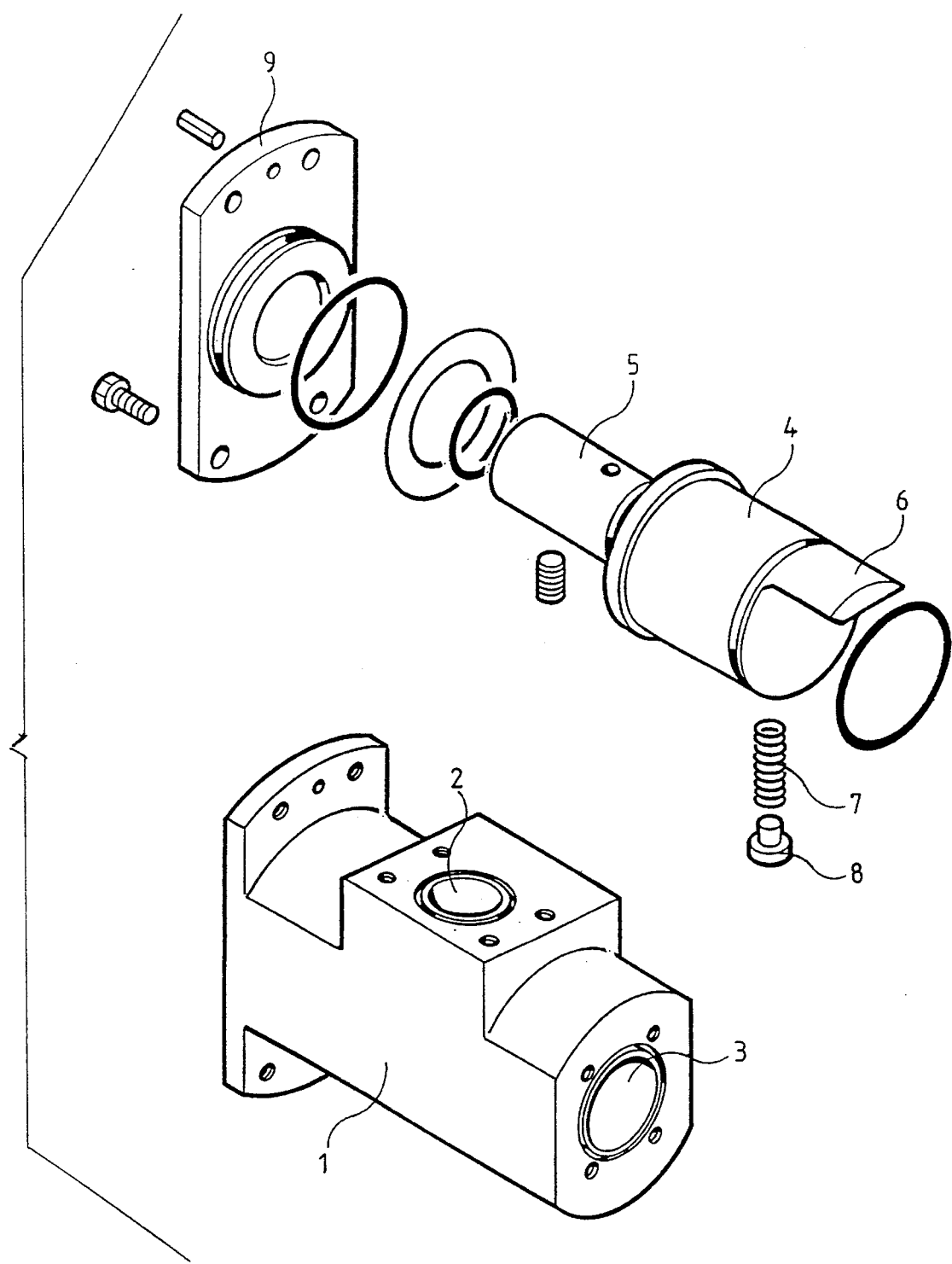
FIG. 2 is an explosion view of the same valve.
Figure 3:
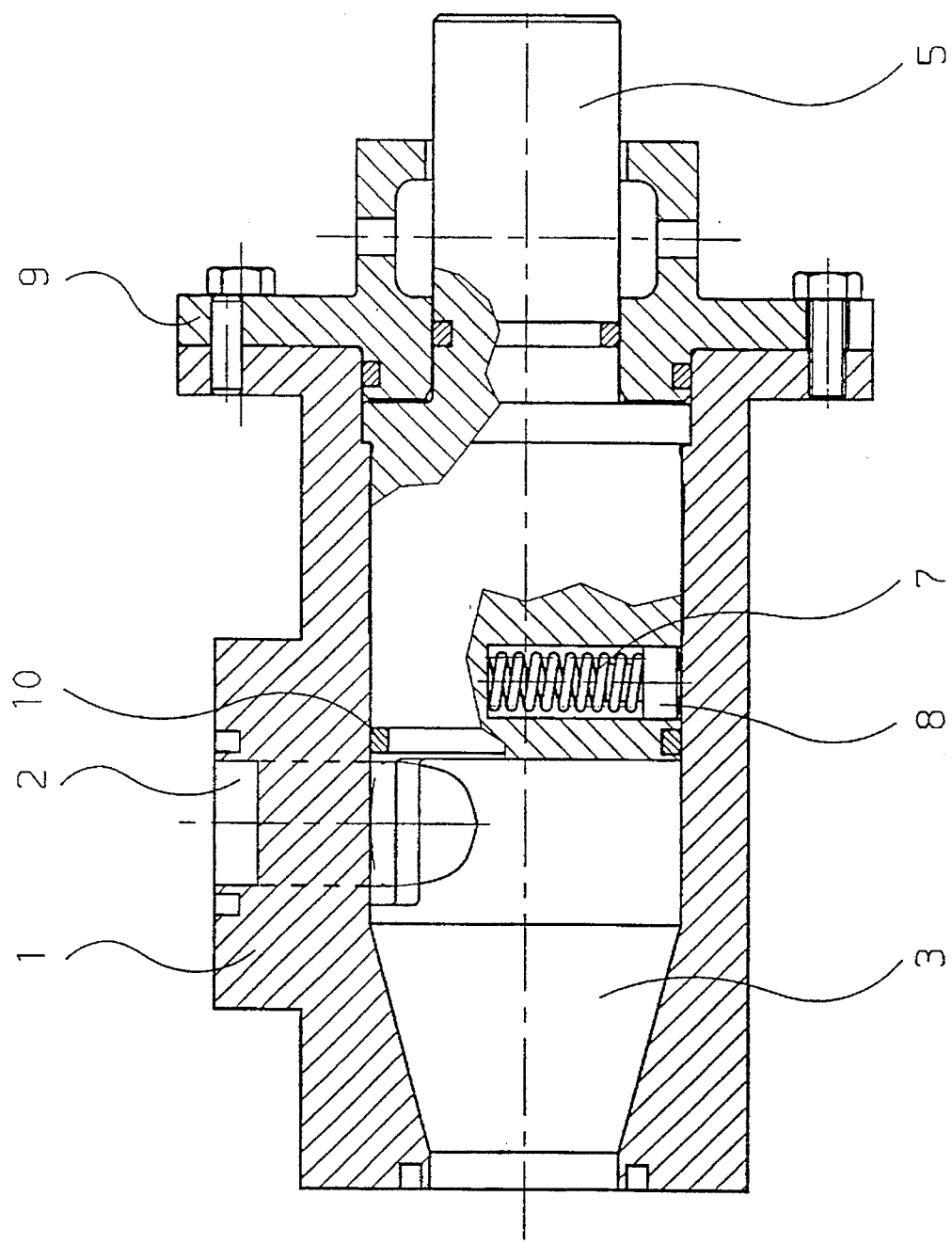
FIG. 3 is a vertical section of the same valve.

The valve body 1 is provided with an inlet passage 2 and an outlet passage 3. The inner wall of the space inside the valve body is preferably a continuous rotationally symmetric surface with an opening for the inlet passage. The outlet passage is conical tapering towards the end. The inlet passage joins tangentially the the inner wall of the space inside the valve body. The center axis of the inlet and outlet passages do not intersect.

The closure member 4 of the valve is a plug rotatable inside the valve body 1 around the center axis of the outlet passage 2. The outer surface of the closure member is a part of a rotational symmetric surface which corresponds to the shape of the inner surface of the body and fits tightly against it. The closure member is provided with a shaft 5 protruding outside the valve body, for rotating the closure member around the center axis of the outlet passage.

In the embodiment of FIGS. 1–4, the pluglike part of the closure member has on one side of its mantle surface a tonguelike extension 6 which in the closed position closes the inlet passage.

The closure member is also provided with a spring 7 and a bearing member 8 on the opposite side of the mantle surface part 6 which closes the inlet passage. This spring presses the closing surface tightly against the inner wall of the valve body so that between the valve body and the closing surface no gap is formed where fibers could be accumulated.

At that end of the valve where the shaft 5 extends, there is a turnable lock 9 tightly fastened to a planar surface perpendicular to the rotational axis of the closure member. Sealing 10 is fitted between the closure member and the body of the valve. The sealing also prevents fibers from accumulating.

The wet surface area between the inner surface of the valve body and the planar turnable lock can easily be polished. This together with the symmetry of the surfaces efficiently prevents fibers from accumulating in the flow space.

When the valve is open and liquid or pulp suspension is fed into the valve, the flow passes the inlet passage 2. When the flow joins tangentially the space inside the valve body, it forms a vortex and strong turbulence. The clogging of the valve by fibers is prevented in this way.

Figure 4C:
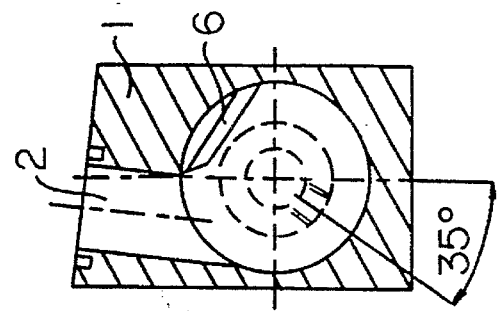
FIGS. 4A, 4B and 4C show a cross-section of the valve taken perpendicularly to the outward passage.
Figure 4B:
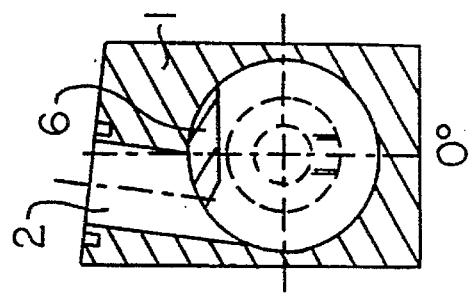
Figure 4A:
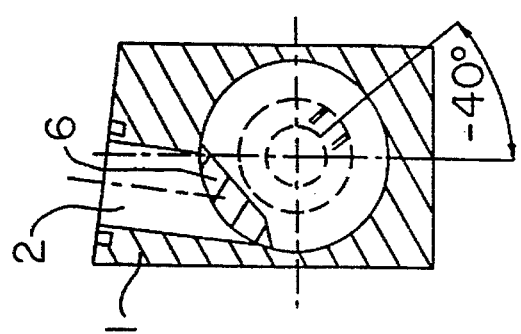
Figure 4D:
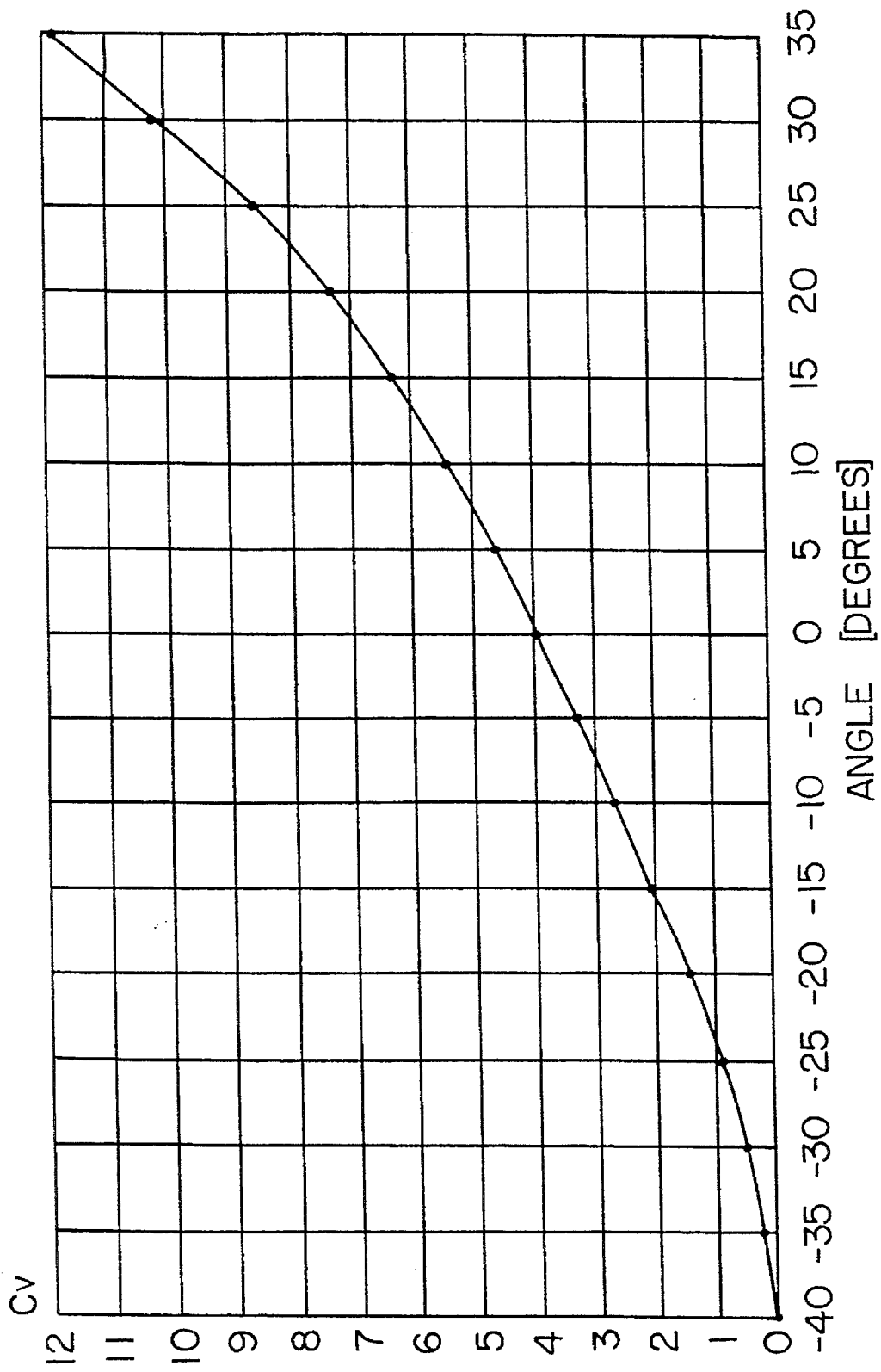
FIG. 4D shows a characteristic curve of the valve.

In FIG. 4A, it can be seen that when the closure member is turned to an angle of −40°, as shown in FIG. 4B the valve is fully closed. At the position of 0°, the valve is half open, and at the position of 35°, the valve is fully open as shown in FIG. 4C. The opening of the valve takes place by rotating the closure member in a plane which is perpendicular to the center line of the valve body and the outlet passage. The flow opening is first formed on that edge of the opening of the inlet passage which tangentially joins the outlet passage. While the closure member is rotated further and the flow opening increases, the tangential flow is maintained all the time. As shown in FIG. 4D, the flow volume is shown relative to the angular position of the closure member.

Figure 6:
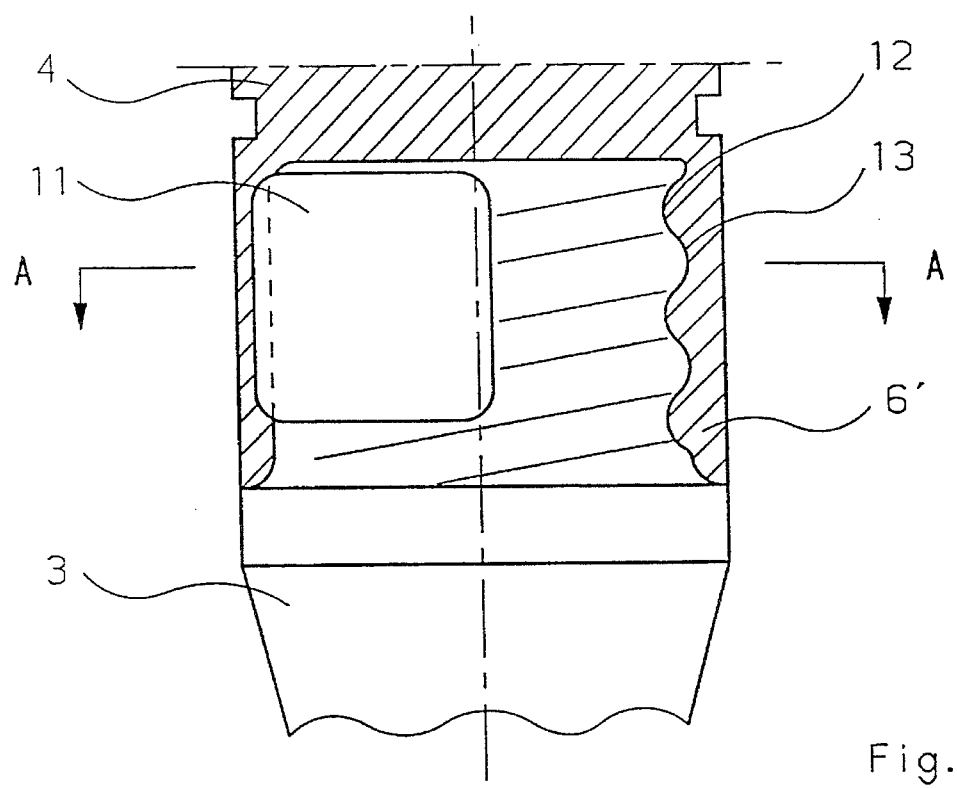
FIG. 6 shows section A—A of FIG. 5.
Figure 5:
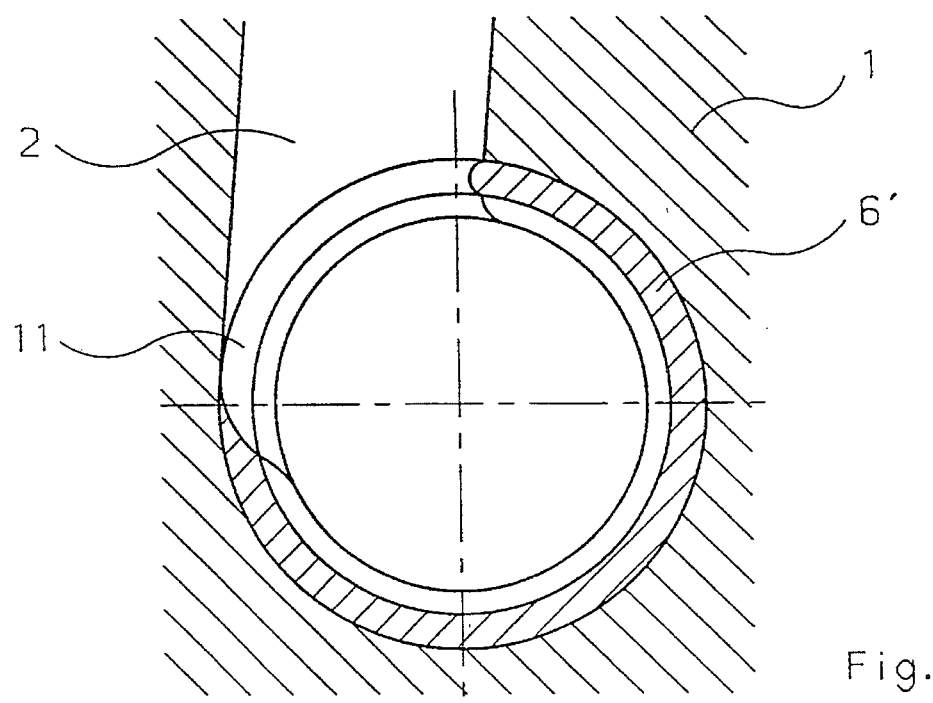
FIG. 5 shows another embodiment of the closure member, in section taken perpendicularly to the outlet passage.

In the embodiment of FIGS. 5 and 6, the closure member 6' at the end of the plug 4 is sleevelike and has an opening 11 on its side. The size and shape of the opening correspond to the size and shape of the end of the inlet passage. The inner surface of the closure member 4' is provided with a spiral ridge 12 and between the sides of the ridge, a spiral groove 13, in order to improve the formation of the turbulence or vortex. The sleevelike closure member can be made for instance of plastic. When wet, it presses tightly against the valve body and prevents fibers from entering between the valve body and the closure member.

In the embodiments shown, the flow from the inlet passage is turned 90° in a plane which joins the center line of the inlet passage and is parallel to the center line of the outlet passage. This angle, however may vary, and is preferably between 45°–90°.

The cross section of the inlet passage at the connection with the inner wall of the valve body can be for instance rectangular, elliptical, oval or circular.

We claim:

1. A valve including a valve body having an interior chamber, a closure member mounted for rotation in said interior chamber for adjusting the flow volume through said valve body, an inlet passage having an opening to said interior chamber, said opening being tangentially located relative to said interior chamber with said closure member being rotatable to move between an open position and a closed position relative to said opening.

2. A valve according to claim 1, characterized in that said valve has a longitudinal axis extending through an outlet passage and the closure member is rotatable about the longitudinal axis of the outlet passage.

3. A valve including a valve body having an interior chamber defined by an inner wall, a closure member mounted for rotation in said interior chamber for adjusting the flow volume through said valve body, an inlet passage having an opening onto said interior chamber, said opening being tangentially located relative to said interior chamber with said closure member being rotatable to move between an open position and a closed position relative to said opening, said closure member being a plug with a tongue like extension at an end thereof, said extension fitting against said inner wall of said interior chamber and in the closed position of said valve, closing said opening between the inlet passage and said interior chamber.

4. A valve including a valve body having an interior chamber defined by an inner wall, a closure member mounted for rotation in said interior chamber for adjusting the flow volume through said valve body, an inlet passage having an opening onto said interior chamber, said opening being tangentially located relative to said interior chamber with said closure member being rotatable to move between an open position and a closed position relative to said opening, said closure member being a plug with a sleeve like part at an end thereof which sleeve like part fits against said inner wall of said interior chamber and has on the side of the sleeve like part an opening which in the open position of said closure member connects said inlet passage and the interior chamber of said valve body.

5. The valve as claimed in claim 4 wherein said sleeve like part has an inner wall provided with a spiral groove.

* * * * *